(12) United States Patent
Binder et al.

(10) Patent No.: US 7,765,162 B2
(45) Date of Patent: Jul. 27, 2010

(54) METHOD AND SYSTEM FOR CONDUCTING OFF-LINE AND ON-LINE PRE-AUTHORIZED PAYMENT TRANSACTIONS

(75) Inventors: Philip Binder, Ramsey, NJ (US); Adam Gluck, Ardsley, NY (US)

(73) Assignee: MasterCard International Incorporated, Purchase, NY (US)

( * ) Notice: Subject to any disclaimer, the term of this patent is extended or adjusted under 35 U.S.C. 154(b) by 1115 days.

(21) Appl. No.: 10/680,373

(22) Filed: Oct. 7, 2003

(65) Prior Publication Data

US 2004/0230535 A1    Nov. 18, 2004

Related U.S. Application Data

(60) Provisional application No. 60/416,488, filed on Oct. 7, 2002.

(51) Int. Cl.
G06F 21/00 (2006.01)
G06Q 20/00 (2006.01)

(52) U.S. Cl. .................... 705/66; 705/64; 705/65; 705/73

(58) Field of Classification Search .................... None
See application file for complete search history.

(56) References Cited

U.S. PATENT DOCUMENTS

| | | | | |
|---|---|---|---|---|
| 3,594,727 A | * | 7/1971 | Braun | 235/379 |
| 4,745,267 A | * | 5/1988 | Davis et al. | 235/379 |
| 5,256,863 A | * | 10/1993 | Ferguson et al. | 705/21 |
| 5,317,636 A | * | 5/1994 | Vizcaino | 705/65 |
| 5,477,038 A | | 12/1995 | Levine et al. | 235/380 |
| 5,557,516 A | | 9/1996 | Hogan | 364/406 |
| 5,692,132 A | | 11/1997 | Hogan | 395/227 |
| 5,704,046 A | | 12/1997 | Hogan | 395/239 |
| 5,902,981 A | * | 5/1999 | Dethloff | 235/375 |
| 5,914,472 A | * | 6/1999 | Foladare et al. | 235/380 |
| 5,953,710 A | * | 9/1999 | Fleming | 705/38 |
| 6,003,014 A | * | 12/1999 | Lee et al. | 705/13 |
| 6,029,887 A | * | 2/2000 | Furuhashi et al. | 235/379 |
| 6,105,008 A | * | 8/2000 | Davis et al. | 705/41 |

(Continued)

OTHER PUBLICATIONS

"Cash Just Isn't Flexible Enough," Daily Express, Feb. 10, 1995, by Nick Rosen.*

(Continued)

Primary Examiner—Andrew J. Fischer
Assistant Examiner—Joshua Murdough
(74) Attorney, Agent, or Firm—Baker Botts L.L.P.

(57) ABSTRACT

A system and method for conducting a financial transaction using an integrated circuit device issued by a card issuer and capable of conducting off-line and on-line transactions with a payment card network. The method includes utilizing the card for conducting a transaction and reading from the card a pre-authorized balance, a pre-authorized limit, and an account number. The method also includes requesting on-line authorization in the event the value of the transaction is greater than the difference between the pre-authorized limit and the pre-authorized balance. Finally, the method includes receiving authorization to conduct the transaction and updating by the card the pre-authorized balance and the pre-authorized limit, wherein the card issuer, through the integrated circuit device, is able to continually update the pre-authorized limit based on various factors including the transaction and account activity.

15 Claims, 12 Drawing Sheets

U.S. PATENT DOCUMENTS

| | | | |
|---|---|---|---|
| 6,434,238 B1 * | 8/2002 | Chaum et al. .................. | 380/45 |
| 6,473,500 B1 | 10/2002 | Risafi et al. ............ | 379/144.01 |
| 6,954,793 B2 * | 10/2005 | Ramaswamy et al. ....... | 709/229 |
| 7,177,849 B2 * | 2/2007 | Fieschi et al. .................. | 705/72 |
| 7,328,191 B2 * | 2/2008 | McGee et al. .................. | 705/67 |
| 2003/0028481 A1 * | 2/2003 | Flitcroft et al. ............... | 705/39 |
| 2003/0053609 A1 | 3/2003 | Risafi et al. | |
| 2003/0140228 A1 | 7/2003 | Binder | |

OTHER PUBLICATIONS

Rudd, Judith S. et al. Emerging Electronic Methods for Making Retail Payments, Jun. 1996. DIANE Publishing.*

The Bank Credit Card Business, 2nd Edition, American Bankers Association, 1996.*

Bragg, Steven M., Accounting Best Practices, John Wiley and Sons, Inc. 1999.*

Freedompay.com, from Aug. 11, 2002. obtained from archive.org on Jun. 11, 2008.*

EMV '96 Integrated Circuit Card Terminal Specification for Payment Systems, Version 3.1.1. May 31, 1998, from www.emvco.com on Nov. 6, 2007.*

EMV 2000 Integrated Circuit Card Specification for Payment Systems, Version 4.0, Dec. 2000, from www.emvco.com on Nov. 6, 2007 (4 books).*

EMV '96 Integrated Circuit Card Specification Specification for Payment Systems, Version 3.1.1. May 31, 1998, from www.emvco.com on Jun. 11, 2008.*

Stice, Earl K. Financial Accounting: Reporting and Analysis, 6th Edition, South-Western, Mason, Ohio, 2003.*

Rankl, W. Smart Card Handbook, 2nd Edition, John Wiley & Sons, Ltd., New York, NY 2000.*

* cited by examiner

METHOD AND SYSTEM FOR CONDUCTING OFF-LINE AND ON-LINE PRE-AUTHORIZED PAYMENT TRANSACTIONS

RELATED APPLICATIONS

This application claims priority to U.S. Provisional Application Ser. No. 60/416,488 filed Oct. 7, 2002, which is incorporated by reference herein in its entirety.

BACKGROUND OF THE INVENTION

1. Field of the Invention

The present invention relates generally to a system and method for performing financial transactions with cards and more particularly relates to a system and method for performing financial transactions with integrated circuit cards using a pre-authorized amount.

2. Background of the Invention

With the advancement of the computer industry, the use of payment cards, such as magnetic stripe cards and smart cards, has become the preferred method of transacting business. Using such payment cards simplifies the purchase of goods and/or services by avoiding the necessity of using hard currency for such transactions. Facilitating the use of these payment cards are electronic payment or card accepting terminals, such as credit card reading terminals.

Nonetheless, today in many markets a substantial portion of the population does not have a payment card or even a bank account. In some cases this is due to potential account holders' lack of credit history, exceeding risk profiles or simply lack of transportation to bank branches. This un-banked or under-banked segment has the possibility to be converted into low risk accounts and grown over time into a profitable cardholder base.

In recent years, an electronic wallet system has been suggested in which a monetary amount can be exchanged by communication between integrated circuit ("IC") cards or between an IC card and a point of sale ("POS") terminal. The IC card used for this system includes a microprocessor having a communication function and a memory such as electrically erasable programmable read-only memory ("EEPROM") for storing a processing program, such as the MONDEX™ electronic cash application developed by Mondex International, Ltd. The processing program is capable of configuring the IC card to function as a credit card, a debit card or an electronic cash card.

If configured to function as a cash card, the IC card can be used for offline commercial transactions of merchandises, commodities and the like, and to allow information or data representing a monetary amount to be stored in a memory incorporated in the IC card. However, when the IC card runs out of electronic cash, the cardholder must deposit additional cash onto the IC card using a specialized terminal.

If configured as a credit card or a debit card, information of the monetary amount involved in the transaction is transferred to a POS, which initiates an authorization request for an eventual authorization or denial from a payment card issuing agency. Whether the IC card is configured as a credit card or a debit card, the cardholder must have a credit account or a bank account, respectively, known by the issuing agency in order to use the IC card.

By examining the limitations of the current POS payment solutions and analyzing the likely future demands, it is preferable to provide a more flexible, configurable and controllable method for enabling a certain portion of the population having no credit history, a bad credit history or no bank account to utilize an IC card payment system.

SUMMARY OF THE INVENTION

An object of the present invention is to provide a method and system for providing a more flexible, configurable and controllable environment for enabling a certain portion of the population to utilize a modern IC card payment system. Another object of the present invention is to provide a method and system for using a transaction card capable of utilizing a pre-authorized amount on existing infrastructure, including POS terminals.

Another object of the present invention is to provide a system and method for conducting a financial transaction using an integrated circuit device issued by a card issuer, associated with an account and capable of conducting off-line and on-line transactions with a payment card network. The method includes providing the integrated circuit device with a pre-authorized limit representing the maximum value which may be utilized with the card for at least one off-line transaction without communication with the payment network for authorization of the transaction, and storing on the integrated circuit device a pre-authorized balance representing the value of transactions conducted with the card without on-line communication with the payment network for authorization of the transaction. The method also includes utilizing the card for conducting the transaction and reading from the card the pre-authorized balance, the pre-authorized limit, and an account number associated with the account. The method further includes determining to initiate an on-line authorization request in the event the value of the transaction is greater than the difference between the pre-authorized limit and the pre-authorized balance and if it is determined that an online authorization is necessary, initiating an on-line authorization request by communicating with the payment network. Finally, the method includes receiving authorization to conduct the transaction and updating by the card the pre-authorized balance and the pre-authorized limit, wherein the card issuer, through the integrated circuit device, is able to update the pre-authorized limit. The update may take place continually after each on-line transaction and a new limit may be set as a function of the transaction, account use, and/or account balance. Alternatively, the update may take place at the customer's request.

Another object of the present invention is to provide an integrated circuit device for conducting an off-line and on-line financial transaction. The integrated circuit device is issued by a card issuer, associated with an account and capable of conducting off-line and on-line transactions with a payment card network. The integrated circuit device includes a memory unit and a processing unit. The memory unit stores a pre-authorized balance, a pre-authorized limit, and an account number associated with the account. The card issuer establishes the pre-authorized limit which represents the maximum value which may be utilized with the card for at least one off-line transaction without communication with the payment network for authorization of the transaction. The pre-authorized balance represents the value of transactions conducted with the card without on-line communication with the payment network for authorization of the transaction. The processing unit is in communication with the memory unit. The processing unit is responsive to a request to purchase at least one good or service. Receipt of the request causes the processing unit to read from the pre-authorized balance, pre-authorized limit, and account number from the memory unit. The processing unit determines whether to initiate an on-line authorization request in the event the value of the transaction is greater than the difference between the pre-authorized limit and the pre-authorized balance. If the processing unit determines that an on-line authorization request is necessary, an on-line authorization request is issued by communicating with the integrated circuit device using the payment network. In response to the request, the processing unit may receive authorization to conduct the transaction and update the pre-authorized balance and the pre-authorized limit, wherein the card issuer, through the processing unit, is able to update the pre-authorized limit.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1A:
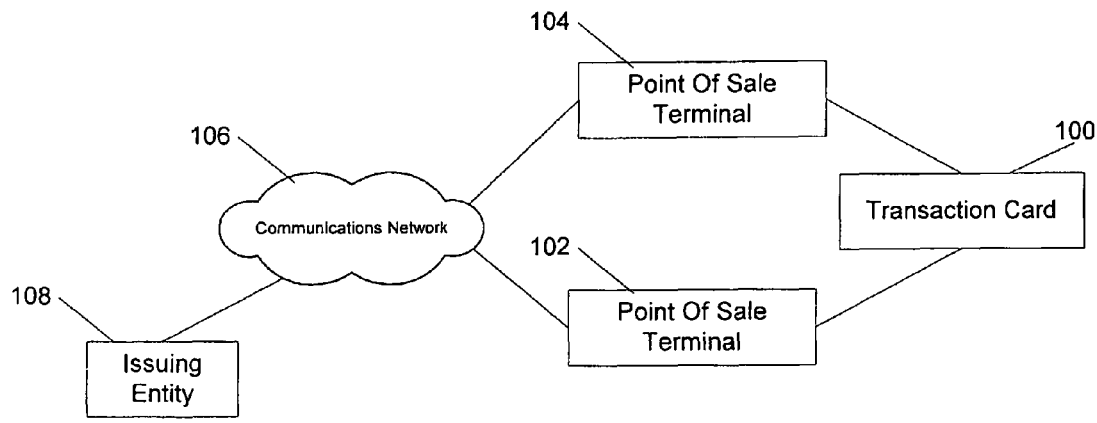
FIG. 1A is a diagram of the interacting components of a system for storing data having multiple security levels according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

In accordance with the system of the present invention, a consumer can use a transaction card to make purchases at a point of sale ("POS") terminal using a pre-authorized amount, defined as an amount or value which the cardholder can use which is "pre-authorized" or does not have to be subject to an on-line authorization request which would seek authorization for the transaction through a payment card system (such as the MasterCard network) from the issuer bank (i.e., the bank which issued the card). Purchases by the cardholder valued under the "pre-authorized amount" may take place "off-line" (i.e., without the need to go on-line for authorization). Each of the at least one POS terminals (which could be a personal computer, a personal digital assistant, cell phone, or the like) has a processor, interface hardware, and interface software configured to interact with the transaction card. If not embedded in the interface hardware, the POS terminal may have a separate card reader. Also part of the system are external networks for transmitting over communication lines financial and banking information. The present invention facilitates the purchase of goods and services at a POS terminal without using paper currency by utilizing a pre-authorized amount the limit for which can be modified online as specified below.

The transaction card is preferably an integrated circuit ("IC") card (also called a "smart card"), which is typically the size of a conventional credit card, but which contains a microprocessor and memory. The card can be used to perform financial transactions in various modes. In the preferred embodiment, the IC card can perform credit, debit, pre-authorized amount or electronic cash card functions, or a combination of the four, that allow a cardholder to make purchases. Transaction data can also be recorded on the card.

The system, as illustrated in FIG. 1A, preferably includes a transaction card 100, POS terminals 102, 104, a communications network 106 and an issuing entity 108, each of which will now be briefly described. The transaction card 100 includes a payment application which allows the transaction card 100 to carry out financial transactions as a credit card, a debit card, a pre-authorized amount card or an electronic cash card, as described in greater detail below. Each of the POS terminals 102, 104 execute a POS terminal application, which may be integrated with an electronic card reader. In particular, the reader reads information stored in the transaction card 100, and the POS terminal 102, 104 acts upon the received information, also as described in greater detail below. The communications network 106 allows the POS terminals 102, 104 to communicate through a payment network (not shown) with the issuing entity 108. The communications network 106 carries information from the POS terminals 102, 104 through the payment network to the issuing entity 108 detailing sale transactions occurring at the POS terminals 102, 104 and/or sales transactions stored on the IC card 100, and from the issuing entity 108 back through the payment network to the POS terminals 102, 104 and consequently the transaction card 100 approving or denying the sale transactions, as described below.

In an alternate embodiment, an agent (not shown) of the issuing entity 108, acting on behalf of the issuing entity 108, may communicate with the communications network 106 without involving the issuing entity 108 directly in the transaction.

Preferably, the communications network 106 is a telecommunication network and/or private networks. The issuing entity 108 controls the ability to replenish or renew the pre-authorized amount. The pre-authorized amount as used in this application is the difference between the "pre-authorized limit" (i.e., the maximum amount initially set by the issuer which the user can cumulatively spend using the card without going on-line and communicating with the issuer) and the "pre-authorized balance" (i.e., the amount actually spent by the cardholder without going on-line and communicating with the issuer). The pre-authorized amount therefore preferably includes a pre-authorized balance field and a pre-authorized limit field, as well as an issuing country field and/or a currency field. The issuing entity 108 maintains an underlying account which supports the pre-authorized amount. Preferably, the underlying account will have a positive balance at least equal to the maximum amount of the pre-authorized amount (i.e., pre-authorized limit) before authorizing a replenishment or renewal of the pre-authorized amount or updating the pre-authorized limit.

Figure 1B:
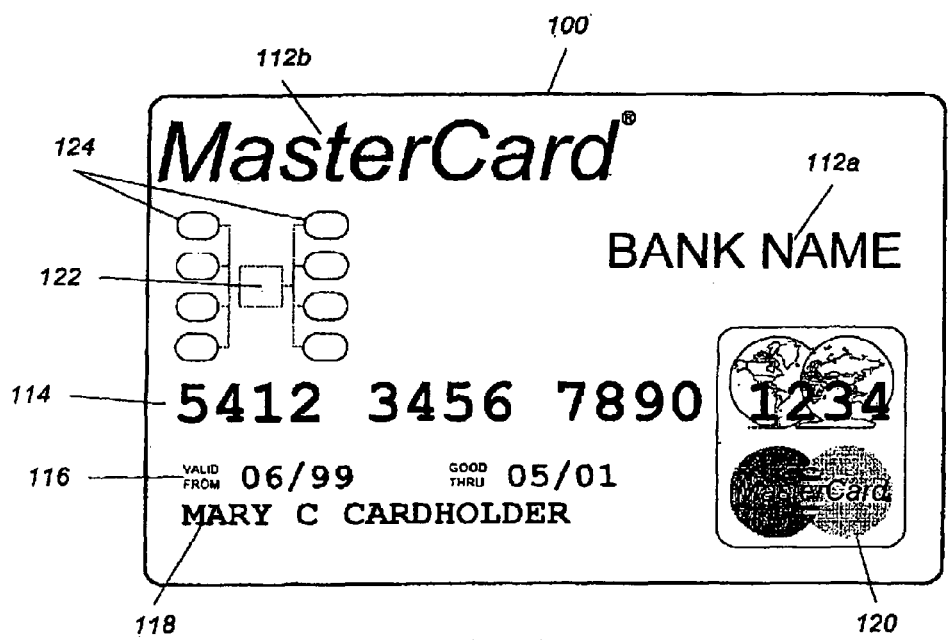
FIG. 1B is a diagram of a transaction card incorporating integrated circuit technology according to an exemplary embodiment of the present invention.

FIG. 1B illustrates the transaction card 100. The transaction card 100 incorporates integrated circuit technology into a conventional credit card. The transaction card 100 looks similar to a conventional credit card, but also includes an integrated circuit ("IC") 122, which contains a microprocessor, and electrical contacts 124 for communications between the IC 122 and devices external to the transaction card 100. The transaction card 100 can be used as a credit card and/or a debit card. If used as a credit card or a debit card, a pre-authorized amount may be used to augment the functionality of the credit card or debit card. Similar to a conventional credit card, the front side of the transaction card 100 preferably contains the name 112a of a financial institution that issues the card and/or the name 112b of a payment system (e.g., MasterCard®) under whose authority the card is issued, a cardholder's account number 114, the cardholder's name 118, dates 116 between which the card is valid and usable, and a brand 120 associated with the payment system.

In an alternate embodiment, the transaction card 100 may be replaced by an integrated circuit device. The integrated circuit device may have a form factor different than that of the transaction card 100. The integrated circuit device can be a mini-card, a key FOB, a contactless IC card, and the like. The integrated circuit device includes the IC 122, which may not be visible. The integrated circuit device may not include the other elements of the transaction card 100. The integrated circuit device may utilize electrical contacts 124 for communications between the IC 122 and devices external to the integrated circuit device. Alternatively, the integrated circuit device may utilize different modes of communication with external devices including radio frequency communication and induction field communication.

Figure 2:
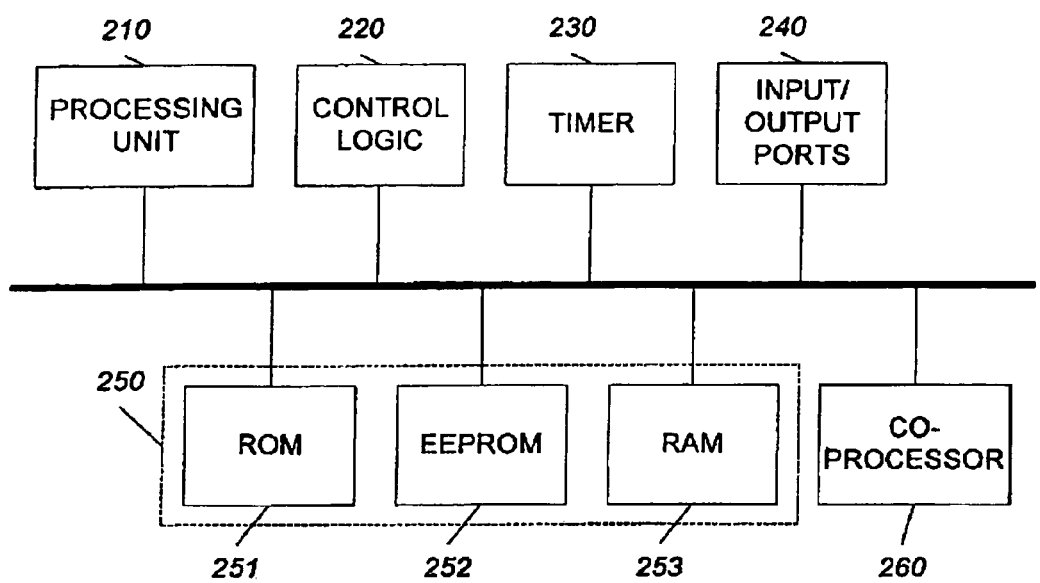
FIG. 2 is a functional block diagram of the integrated circuit section of the card illustrated in FIG. 1B according to an exemplary embodiment of the present invention.

FIG. 2A is a functional block diagram of the IC 122 and contains at least processing unit 210 and memory unit 250. Preferably, the IC 122 also includes control logic 220, a timer 230, and input/output ports 240. The IC 122 can also include a co-processor 260. Control logic 220 provides, in conjunction with processing unit 210, the control necessary to handle communications between memory unit 250 and the input/output ports 240. The timer 230 provides a timing reference signal from processing unit 210 and control logic 220. Co-processor 260 provides the ability to perform complex computations in real time, such as those required by cryptographic algorithms.

Memory unit 250 may include different types of memory, such as volatile and non-volatile memory and read-only and programmable memory. Memory unit 250 stores transaction card data such as secret cryptographic keys and a user's personal identification number ("PIN"). The secret cryptographic keys may be generated by any type of well-known cryptographic algorithm, such as the private keys of public-private key pairs. Preferably, the secret cryptographic keys and the user's PIN are stored in a secure area of ROM or EEPROM that is either not accessible or has very limited accessibility from outside the IC card.

Memory unit 250 stores the operating system of the IC card. The operating system loads and executes IC card applications and provides file management or other basic card services to the IC card applications. One operating system that can be used to implement the present invention is the MULTOS™ operating system licensed by Mondex International Ltd. Preferably, the operating system is stored in ROM 251.

In an alternate embodiment, flash memory or other non-volatile and/or volatile types of memory may also be used in the memory unit 250.

In addition to the basic services provided by the operating system, memory unit 250 may also include one or more IC card applications. For example, a MasterCard® Credit/Debit application could be stored on card 100. Additionally, if the IC card is to be used as an electronic cash card, the MONDEX™ electronic cash application might be included on the IC card, which electronically loads onto the IC card a value of a certain currency from a cardholder's account in a financial institution. An application may include both program and data files, which may be stored in either ROM or EPROM.

Preferably, the memory unit 250 includes the payment application, the pre-authorized balance field, the pre-authorized limit field, and the like. The payment application can configure the transaction card 100 to behave like a credit card, a debit card, a pre-authorized amount card or a cash card. As stated above, the pre-authorized amount includes the pre-authorized balance field and the pre-authorized limit field. The pre-authorized limit field is preferably specified by the issuing entity. The pre-authorized balance field contains a number indicating the amount of money spent off-line using the pre-authorized amount at any particular point. The issuing country field, which is not specifically associated with the pre-authorized amount, includes a country code which is indicative of the country within which the transaction card was issued.

Figure 3:
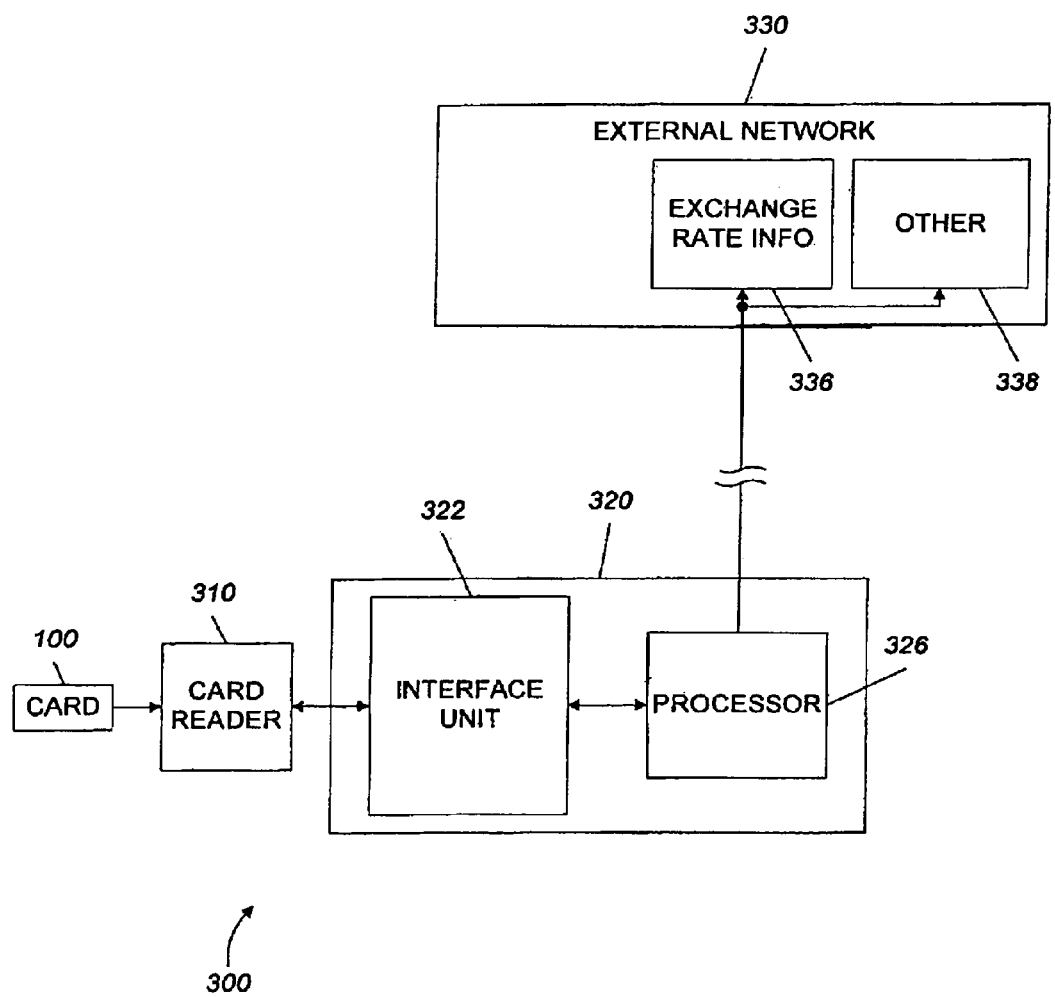
FIG. 3 is a block diagram of a part of the system of FIG. 1A using the transaction card of FIG. 1B according to an exemplary embodiment of the present invention.
Figure 6:
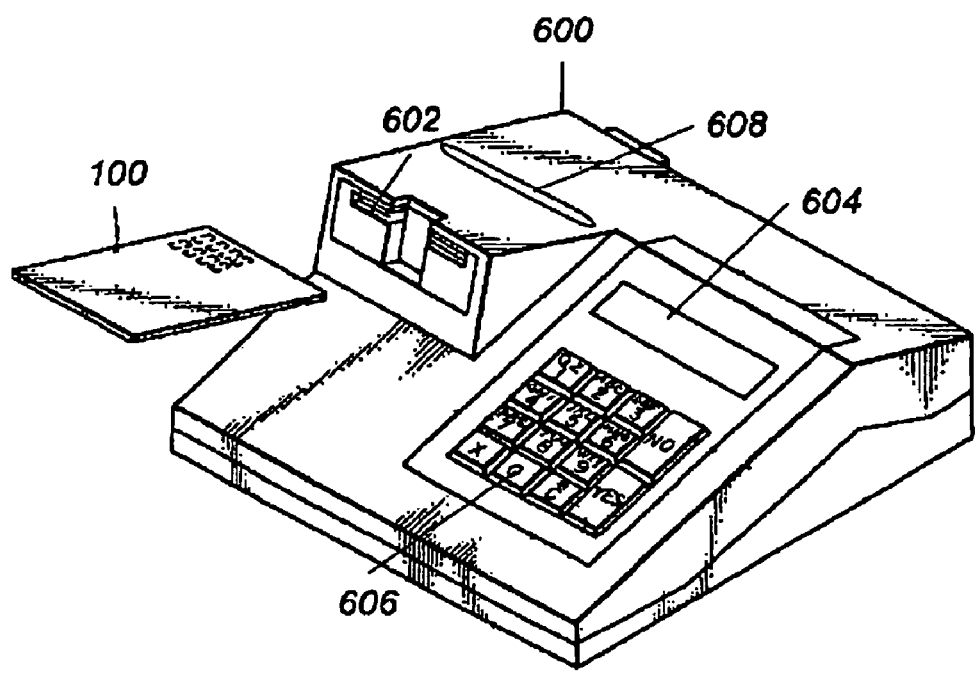
FIG. 6 illustrates a point of sale transaction terminal according to an exemplary embodiment of the present invention.

FIG. 3 is a block diagram of a system 300 for reading information from the IC card. System 300 includes a terminal 320. The term "terminal" generically describes devices with which an IC card may communicate. Several examples of terminals are pictured in FIGS. 4A-4D and 6, including a kiosk-type interface terminal 410 shown in FIG. 4A, a personal computer 470 that operates as a terminal shown in FIG. 4B, a personal digital assistant ("PDA") 480 that operates as a terminal shown in FIG. 4C, a mobile device 490 that operates as a terminal shown in FIG. 4D, and a POS terminal as shown in FIG. 6.

Within terminal 320 are interface unit 322 and processor 326. Interface unit 322 may consist of a combination of hardware and software, including a display screen, designed to communicate with a cardholder, and buttons keypads, or keyboards with which a cardholder inputs data to the terminal. Interface unit 322 may also include a card reader into which the cardholder inserts card 100 in order to exchange data. Alternatively, the card reader could be external to interface unit 322 as shown by card reader 310.

Processor 326 communicates with interface unit 322 and processes the commands and data provided to the terminal by the cardholder. Processor 326 also communicates with devices outside of the terminal and not directly accessible to the cardholder such as external network 330. This communication can be accomplished, for example, using standard short-distance and long-distance communication networks such as local-area and wire-area networks, or via telephone-based or wireless communication lines or dedicated transmission lines. The external network 330 may allow the terminal 320 to communicate with an exchange rate information computer 336, and the like.

Terminal 320 can be located in a store or other commercial establishment that accepts card 100 for the purchase of goods and services. Processor 326 can communicate with devices external to terminal 320 such as credit or debit card processing networks (not shown), to which credit, debit or pre-authorized amount card information can be sent and verification for the purchase can be received. This communication can be accomplished using conventional credit and debit card processing methods.

Figure 4A:
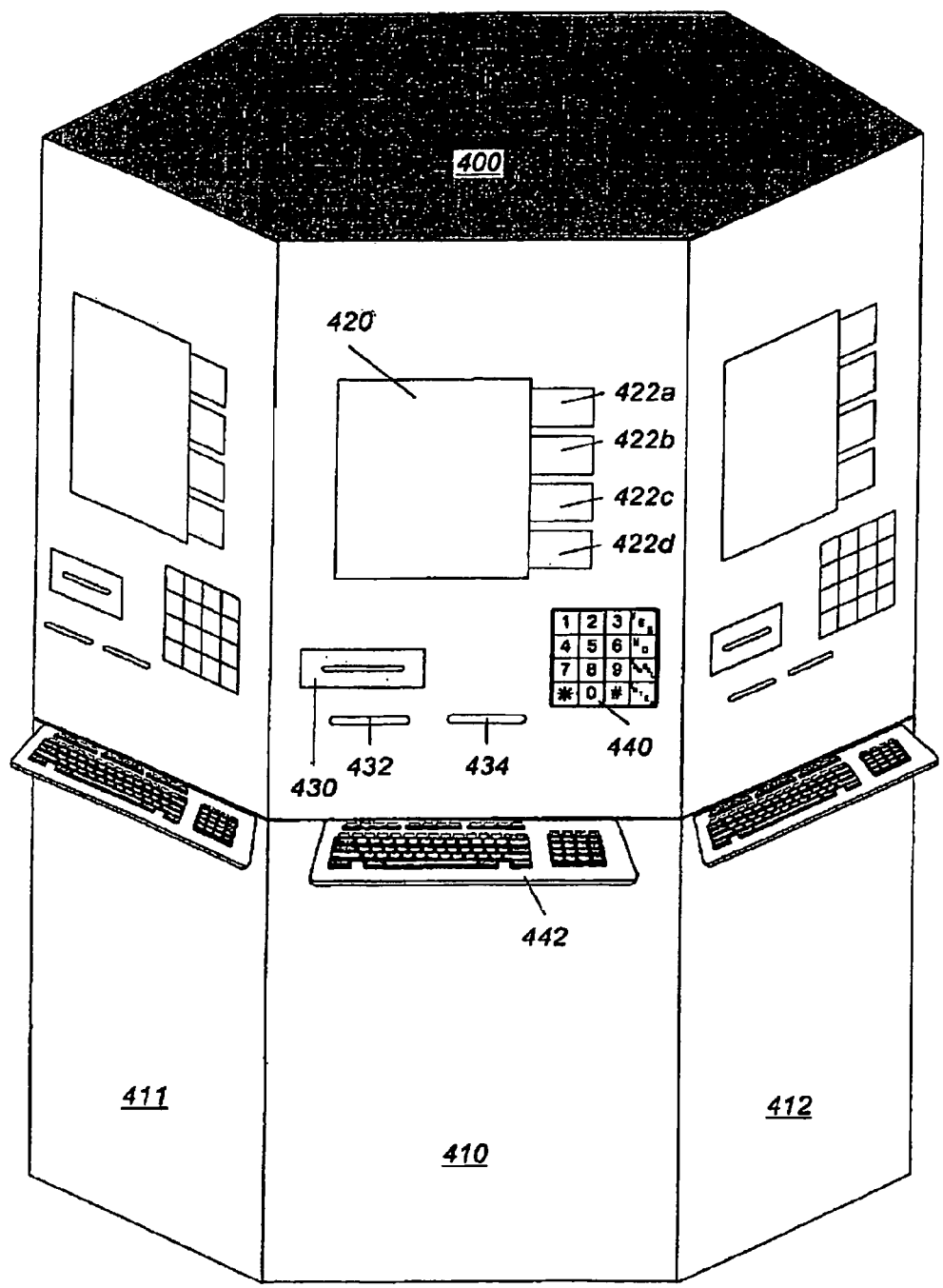
FIG. 4A illustrates a stand alone kiosk terminal for use in the system of FIG. 1A according to an exemplary embodiment of the present invention.

FIGS. 4A-4D illustrate examples of various terminals for use with the IC card 100. Kiosk-type terminal 410 shown in FIG. 4A is a preferred embodiment for use in a public forum such as a shopping mall or movie theater. In FIG. 4A, kiosk 400 contains several terminals 410, 411, 412, each of which operates independently. Each terminal 410, 411, 412 includes a display screen 420, interface buttons 422a, 422b, 422c, and 422d, card receptacle 430, keypad 440, receipt dispenser 432, and refund/cash dispenser 434. Optionally, keyboard 442 may be supplied to allow the user to input words to the terminal. Menus may be displayed on screen 420. Menu options are chosen using buttons 422a-d. Keys on keypad 440 can include the digits 0-9, special characters ("*" or "#"), and some function keys such as "YES," "NO," "Cancel," and "Enter." These keys can be used for inputting a user's PIN and other information. In addition, instead of choosing menu options using buttons 422a-d, a user may choose an option using the keys on keypad 440 or keyboard 442 (e.g., pressing "1" for the first menu option, "2" for the second menu option, etc.). If the kiosk-type terminal 410 is also used as an Automatic Teller Machine ("ATM"), the keys on keypad 440 could be used to input amounts of money to be dispensed by the machine or monetary value to be placed on the electronic cash portion of card 100. In a preferred embodiment, the pre-authorized amount of the transaction card 100 can be altered, i.e. increasing or decreasing the pre-authorized amount, at specified locations by transferring money to or from the pre-authorized amount of the transaction card 100 through use of the kiosk 400. In another preferred embodiment, the pre-authorized amount of the transaction card 100 can be altered, i.e. increasing or decreasing the pre-authorized amount, at specified locations by transferring sums of money to or from the transaction card 100 through use of an ATM.

Figure 4B:
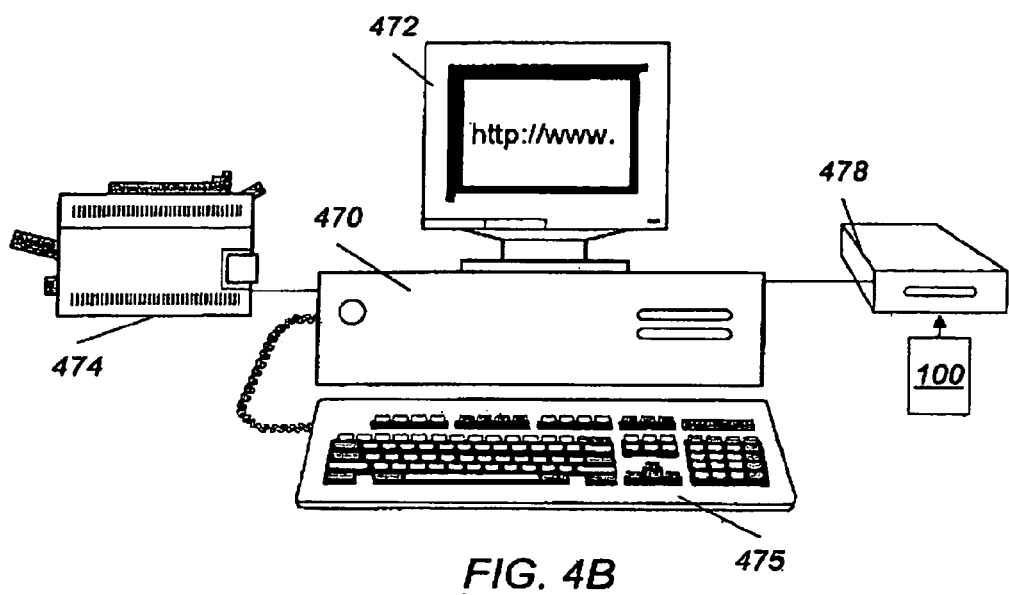
FIG. 4B illustrates a personal computer for use in the system of FIG. 1A using the transaction card of FIG. 1B according to an exemplary embodiment of the present invention.

In FIG. 4B, a computer 470 operates as a transaction terminal or POS terminal via the Internet which communicates with a payment network. Included with computer 470 is monitor 472, keyboard 475, and printer 474. Connected to the serial port of computer 470 is card reader 478 which accepts card 100. The screen of monitor 472 operates in a manner similar to that of display screen 420 in kiosk-type terminal 410. Likewise, printer 474 operates similarly to receipt dispenser 432, and keyboard 475 operates similarly to keypad 440 or keyboard 442, if available. In a preferred embodiment, the pre-authorized amount of the transaction card 100 can be altered, i.e. increasing or decreasing the pre-authorized amount, by transferring money to or from the pre-authorized amount of the transaction card 100 through use of a banking application executing on the computer 470.

Figure 4C:
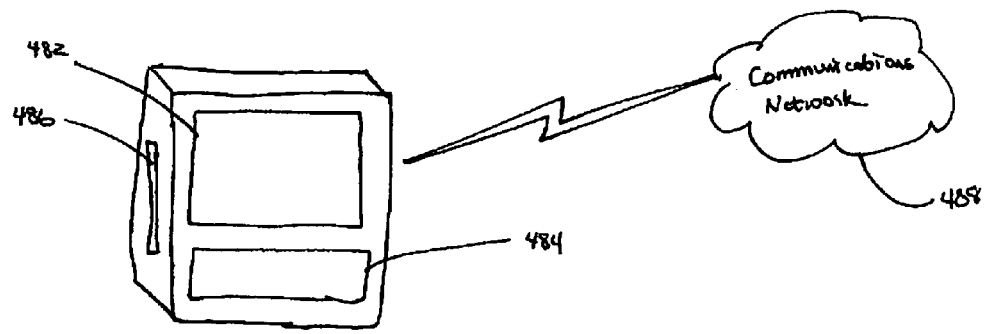
FIG. 4C illustrates a personal digital assistant for use in the system of FIG. 1A using the transaction card of FIG. 1B according to an exemplary embodiment of the present invention.

In FIG. 4C, a PDA 480 operates as a transaction terminal or POS terminal via a communications network 488. Preferably, the communications network 488 is the Internet which communicates with a payment network. Included with the PDA 480 is a display screen 482, a textual input device 484, and a card reader 486. Preferably, the textual input device 484 is a handwriting recognition input device for use with a stylus or other pen-like device. The display screen 482 operates in a manner similar to that of display screen 420 in kiosk-type terminal 410. Likewise, the textual input device 484 operates similarly to keyboard 442. In a preferred embodiment, the pre-authorized amount of the transaction card 100 can be altered, i.e. increasing or decreasing the pre-authorized amount, by transferring money to or from the pre-authorized amount of the transaction card 100 through use of a banking application executing on the PDA 490.

Figure 4D:
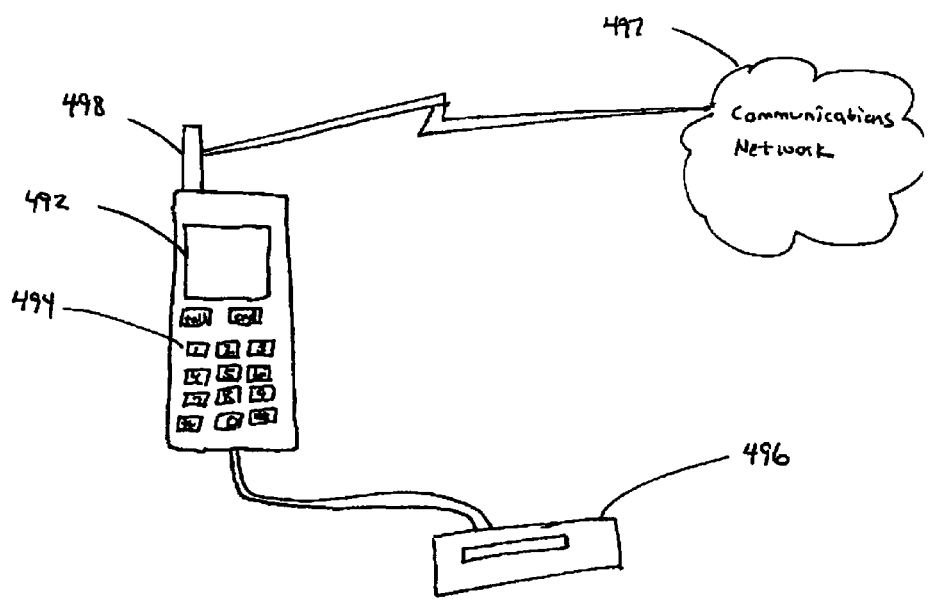
FIG. 4D illustrates a mobile device for use in the system of FIG. 1A using the transaction card of FIG. 1B according to an exemplary embodiment of the present invention.

In FIG. 4D, a mobile device 490 operates as a transaction terminal or POS terminal via a communications network 497. Preferably, the communications network 497 is the Internet which communicates with a payment network. Included with mobile device 490 is a display screen 492, a textual input device 494, and an antenna 498. Preferably, the textual input device 494 is a traditional telephone keypad. The display screen 492 operates in a manner similar to that of display screen 420 in kiosk-type terminal 410. Likewise, the textual input device 494 operates similarly to keypad 440. The mobile device 490 communicates with the communications network 497 through the antenna 498. In a preferred embodiment, the pre-authorized amount of the transaction card 100 can be altered, i.e. increasing or decreasing the pre-authorized amount, by transferring money to or from the pre-authorized amount of the transaction card 100 through use of a banking application executing on the mobile device 490.

A card holder can utilize any of the kiosk-type terminal 410, the computer 470, the PDA 480, the mobile device 490 and a POS terminal to request an increase or decrease in the pre-authorized amount. This request can happen at the same time as a purchase transaction or independent from a purchase transaction at a time different from a purchase transaction.

Figure 5:
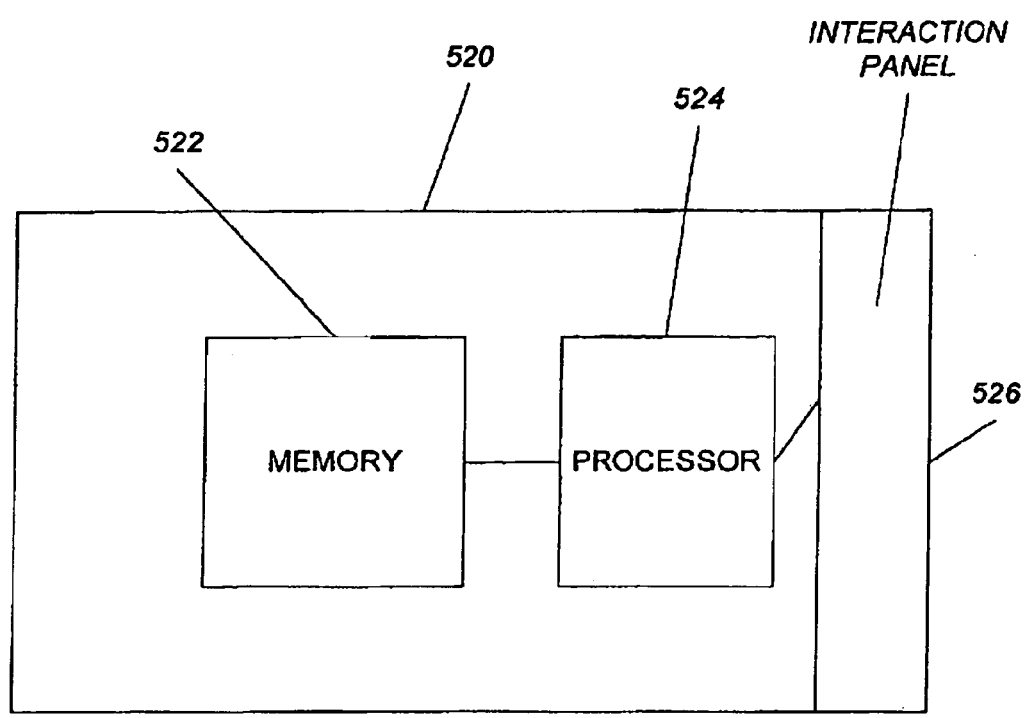
FIG. 5 is a functional block diagram of the terminals illustrated in FIGS. 4A-4D according to an exemplary embodiment of the present invention.

FIG. 5 is a block diagram of the transaction terminals illustrated in FIGS. 4A-4D. Each terminal 520 includes processor 524, connected to both memory 522 and interaction panel 526. Interaction panel 526 includes the display screens, the buttons with which menu options are chosen, the keypad or keyboard, the card receptacle or the card reader, the receipt dispenser or printer, and the refund dispenser. Processor 524 processes, controls, and outputs data to interact with the user via interaction panel 526. Processor 524 also controls memory 522 which stores dynamic information such as the options chosen by the cardholder during the current session, and static information such as transaction history, cardholder PIN, and exchange rate history.

FIG. 6 illustrates a point-of-sale transaction/recording terminal for use with the card 100. A typical terminal 600 includes a card reader 602, a keypad 606, a display 604, and a receipt dispenser 608. Keypad 606 and display 604 allow a cardholder or a merchant to interact with the terminal. Keypad 606 allows the cardholder or the merchant to select a type of transaction, e.g., credit, debit, pre-authorized amount or electronic cash, to input a PIN, and to input transactional information. Display 604 allows the cardholder and the merchant to receive informational messages, such as card approvals and authorization codes, and prompts for data entry.

Figure 7:
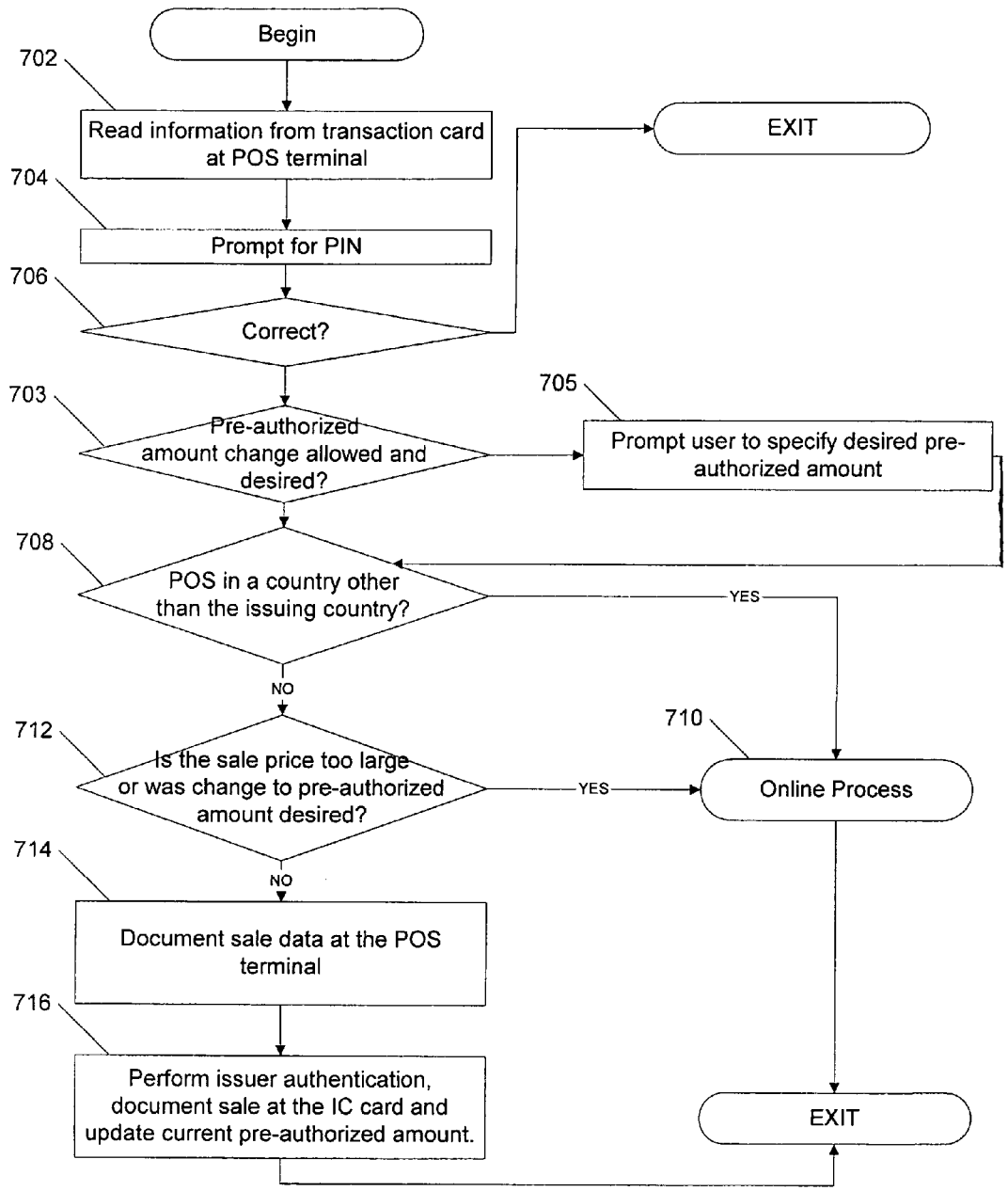
FIG. 7 illustrates a process whereby a point of sale terminal accesses data located within the transaction card necessary to conclude a transaction according to an exemplary embodiment of the present invention.

FIG. 7 illustrates a process 700 whereby the transaction card 100 conducts a financial transaction with the POS terminal 102. The process 700 will be described with reference to POS terminal 102, however alternate POS terminals, including POS terminal 104, may also be used. The process 700 begins at step 702 when the transaction card 100 is used at the POS terminal 102 to purchase goods or services having a predetermined monetary value. At step 702 the transaction card 100 reads the pre-authorized balance field, the pre-authorized limit field and the issuing country field from the memory 250. The pre-authorized balance field indicates the monetary value currently spent on off-line transactions. The pre-authorized limit field indicated the maximum monetary value allowed to be spent before the transaction card 100 insists on going online to receive additional verification from the issuing entity 108. The pre-authorized limit field will have been set by the issuing entity 108. The issuing country field specifies the country in which the transaction card 100 was issued by the issuing entity 108. Once the transaction card 100 reads the pre-authorized balance field, the pre-authorized limit field and the issuing country field from the memory 250, the process 700 advances to step 704.

At step 704, the transaction card 100 instructs the POS terminal 102 to prompt the customer, sometimes referred to as a card holder, for a PIN. Once the customer specifies the PIN, the process 700 advances to step 706.

In an alternate embodiment, a cardholder verification method other than the use of a PIN may be utilized, including use of a biometrics mechanism, password and the like.

At step 706, the transaction card 100 determines if the specified PIN is correct. If the transaction card 100 determines that the PIN is correct, the process 700 advances to step 703. If the PIN is not correct, the process 700 exits.

At step 703, the transaction card 100 determines if the POS terminal 102 is capable of altering the pre-authorized amount upon receiving a customer request to do so and, if so, whether the customer would like to alter the pre-authorized amount. If the POS terminal 102 is capable of altering the pre-authorized amount upon receiving a customer request, the POS terminal 102 prompts the customer to determine if the customer would like to alter the pre-authorized amount currently on the transaction card 100. If the customer wants to alter the pre-authorized amount, the process 700 advances to step 705. If the POS terminal 102 is incapable of altering the pre-authorized amount upon receiving a customer request or if the POS terminal 102 is capable of doing so and the customer does not wish to alter the per-authorized amount, the process 700 advances to step 708.

At step 705, the transaction card 100 instructs the POS terminal 102 to prompt the customer for a requested pre-authorized amount. Once the customer specifies the requested pre-authorized amount, the process 700 advances to step 708.

At step 708, the transaction card 100 determines whether the location of the POS terminal 102 is within the same country as the country indicated by the issuing country field of the transaction card 100. If the country location of the POS terminal 102 is different than the country indicated by the issuing country field, the process 700 advances to the online process step 710. The online process step 710 is described in more detail in relation to FIG. 8. Otherwise, the process 700 advances to step 712.

In an alternate embodiment, the application currency code of the transaction card 100 and the POS currency code may replace the issuing country field of the transaction code 100 and the location of the POS terminal 102, respectively, during the process 700.

At step 712, the transaction card 100 determines whether it should go on-line to complete the transaction. The transaction card 100 goes on-line if the predetermined monetary value of the goods or services the customer wishes to purchase is greater than the difference between the monetary amount of the pre-authorized limit field and the monetary amount of the pre-authorized balance field, in other words, if the sale price is too large. The transaction card 100 will also go on-line if the customer indicated that a change in the pre-authorized amount is desired. If the predetermined monetary value of the goods or services is greater than the difference or if the customer indicated a change is desired, the process 700 advances to the online process step 710. The online process step 710 is described in more detail in relation to FIG. 8. Otherwise, the process 700 advances to step 714.

At step 714, the transaction card 100 begins the completion of the purchase of the goods or services. The transaction card 100 creates a sales record describing the goods or services sold and the monetary amount charged for the goods or services at the POS terminal 102 for subsequent reporting to the issuing entity 108 of the transaction card 100. Once the relevant information is recorded at the POS terminal, the process 700 advances to step 716.

At step 716, the transaction card 100 executes the script message sent by the issuer and then updates the records located on the transaction card 100. Script validation is a process where the card uses a shared secret code (between the card and issuer) to validate that a message has arrived at the card unaltered from the message created by the issuer. Using this process to ensure the authenticity of the data, the transaction card 100 updates the current value of the monetary amount of the pre-authorized balance field on the transaction card 100. The current value of the monetary amount of the pre-authorized balance field is updated by increasing the current value of the monetary amount by the monetary amount charged for the goods or services at the POS terminal 102. Preferably, the transaction card 100 also writes a sales record describing the mandatory amount authorized for the goods or services, the date, and the currency to the memory unit 250 of the transaction card 100. Once the current value of the monetary amount of the pre-authorized balance field is updated, the process 700 is complete and therefore exits.

In a preferred embodiment, the pre-authorized balance field and the pre-authorized limit field are used in a payment application which is compliant with the *EMV* 2000 *Integrated Circuit Card Specification For Payment Systems*, v. 4.0 (Dec. 2000). In a preferred embodiment, the pre-authorized balance field and the pre-authorized limit field are used in a payment application which is compliant with the *EMV '96, Integrated Circuit Card Specification for Payment Systems*, v. 3.1.1 (1998). In still another preferred embodiment, the pre-authorized balance field is the upper cumulative offline transaction amount of M-Chip pre-authorized.

Figure 8:
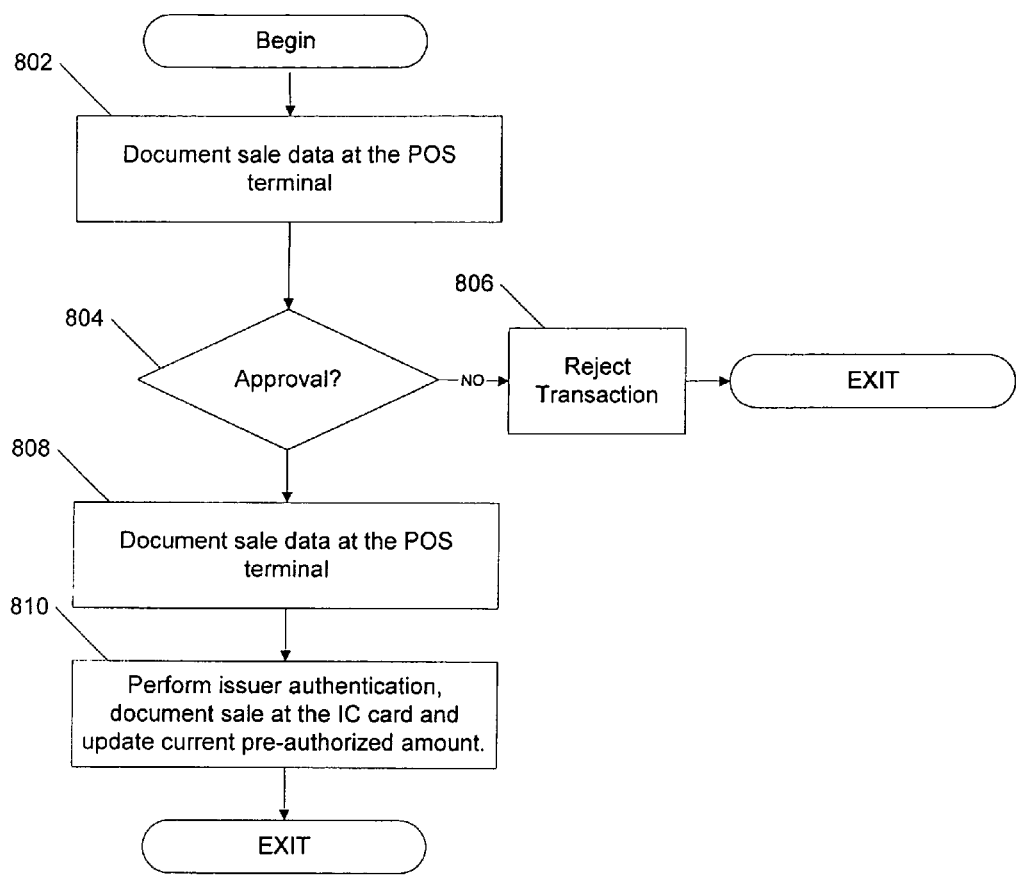
FIG. 8 illustrates a process whereby the point of sale terminal provides a personal identification number to the transaction card in order to have the transaction card decrypt a desired data field according to an exemplary embodiment of the present invention.

FIG. 8 illustrates a process 710 whereby the transaction card 100 determines whether the issuing entity 108 will extend an additional balance to the transaction card 100 to enable the customer to utilize the transaction card 100 to purchase the goods or services and optionally enable the customer to use the transaction card 100 in other off-line purchases by authorizing an additional monetary amount, whether customer requested or not, for the pre-authorized amount. At step 802, the transaction card 100, through the POS terminal 102, sends the issuing entity 108 a message requesting an authorization of a pending purchase transaction and potentially an increase in the current monetary amount of the pre-authorized amount of the transaction card 100. The message sent from the transaction card 100 includes the cardholder's account number 114, the monetary value of the at least one good or service, the current value of the pre-authorized balance field, the current value of the pre-authorized limit field, the requested pre-authorized amount, the country code of the issuing country field and the country code representing the country in which the POS terminal 102 is located. Also included in this transmission to the issuing entity 108 is an authorization request cryptogram. Once the transaction card 100 transmits the appropriate information to the issuing entity 108 of the transaction card 100, the process 710 advances to step 804.

At step 804, the transaction card 100 determines whether the issuing entity 108 of the transaction card 100 approved or declined the pending purchase transaction and/or altered the pre-authorized amount. The transaction card 100 receives a message from the issuing entity 108 through the POS terminal 102 which may include an authorization indicator, an updated pre-authorized balance, an updated pre-authorized limit, and the authorization response cryptogram from the issuing entity 108. If the message received from the issuing entity 108 denies the extension of an additional balance to the transaction card 100, the authorization indicator indicates that the authorization failed. If the issuing entity 108 authorizes the pending purchase transaction, the authorization indicator of the message indicates that the authorization was successful.

Regardless of the authorization indicator, the pre-authorized limit and the pre-authorized balance are updated based on the updated pre-authorized limit and the updated pre-authorized balance, respectively. If the updated pre-authorized balance is not specified, the transaction card 100 does not alter the pre-authorized balance. Further, if the updated pre-authorized balance is specified, the transaction card 100 updates the pre-authorized balance to reflect the updated pre-authorized balance. If the updated pre-authorized limit is not specified, the transaction card 100 does not update the pre-authorized limit. And finally, if the updated pre-authorized limit is specified, the transaction card 100 updates the pre-authorized limit to reflect the updated pre-authorized limit. If the pending purchase transaction is approved, the process 710 advances to step 808. Otherwise, the process 710 advances to step 806.

At step 806, the transaction card 100 in conjunction with the POS terminal 102 informs the customer that use of the pre-authorized amount of the transaction card 100 cannot be used to complete this transaction. Once the transaction card 100 in conjunction with the POS terminal 102 refuse to complete the sale using the pre-authorized amount of the transaction card 100, the processes 710 and 700 exit.

At step 808, the transaction card 100 begins the completion of the purchase of the goods or services using the pre-authorized amount. The transaction card 100 informs the POS terminal 102 that the transaction is complete. The POS terminal 102 creates a sales record describing the goods or services sold and the monetary amount charged for the goods or services at the POS terminal 102. Once the relevant information is recorded by the POS terminal 102, the process 710 advances to step 810.

At step 810, the transaction card 100 executes the script message sent by the issuer and then updates the records located on the transaction card 100. Script validation is a process where the card uses a shared secret code (between the card and issuer) to validate that a message has arrived at the card unaltered from the message created by the issuer. Using this process to ensure the authenticity of the data, the transaction card 100 updates the current value of the monetary amount of the pre-authorized balance field on the transaction card 100. The current value of the monetary amount of the pre-authorized balance field is updated by increasing the current value of the monetary amount by the monetary amount charged for the goods or services at the POS terminal 102. Preferably, the transaction card 100 also writes a sales record describing the mandatory amount authorized for the goods or services, the date, and the currency to the memory unit 250 of the transaction card 100. Once the current value of the monetary amount of the pre-authorized balance field is updated, the processes 710 and 700 exit.

In an alternate embodiment, the message from the issuing entity 108 does not include a new pre-authorized balance. The transaction card 100 sets the current value of the pre-authorized balance field to be equal the value of the purchased good or service. In another alternate embodiment, the message from the issuing entity 108 does not include a new pre-authorized balance. The transaction card 100 sets the current value of the pre-authorized balance field to be equal to zero. In yet another alternate embodiment, the message from the issuing entity 108 does not include a new pre-authorized balance and the transaction card 100 does not alter the pre-authorized balance field.

Figure 10:
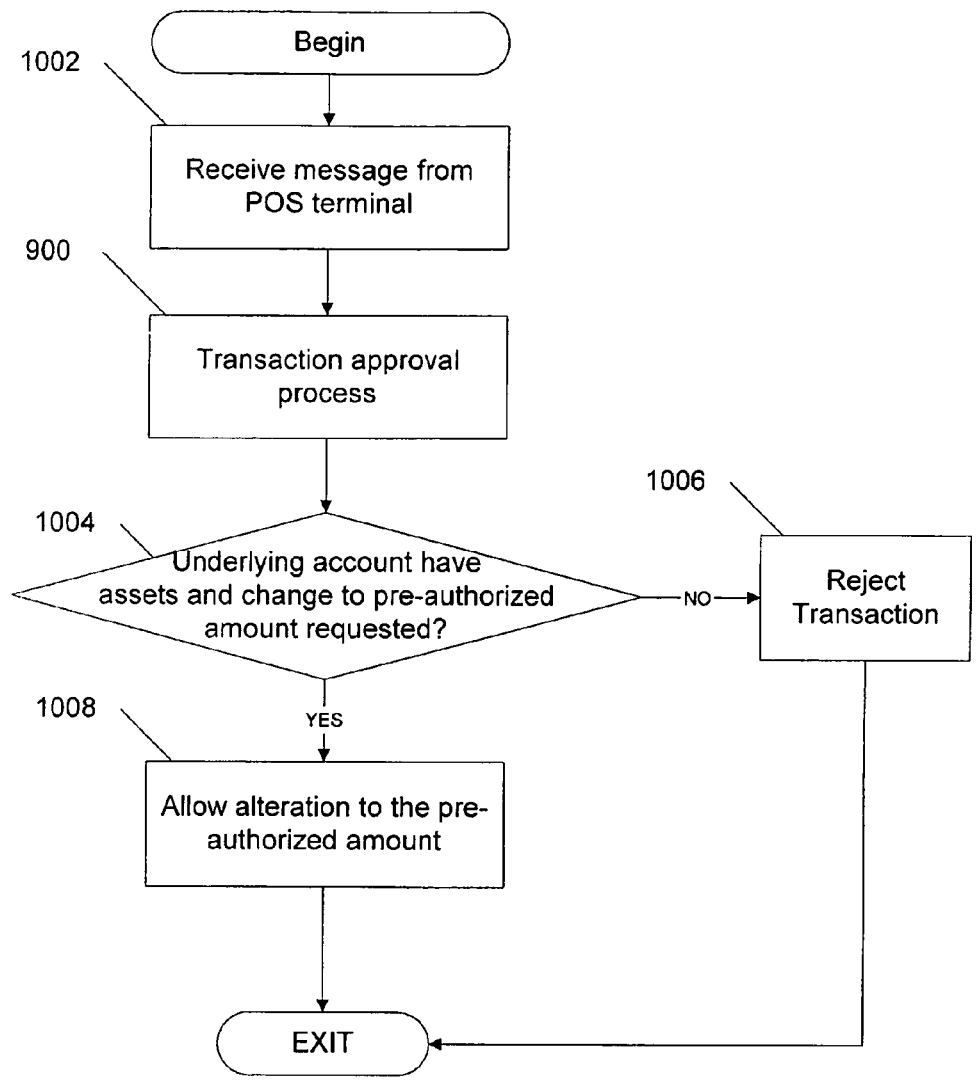
FIG. 10 illustrates a process whereby an issuing entity determines whether to authorize or deny a request for additional funding for the pre-authorized amount of the transaction card.

FIG. 10 illustrates a process 1000 whereby an issuing entity 108 determines whether to authorize or deny a request for additional funding for the pre-authorized amount of the transaction card 100. It should be noted that the issuing entity 108 may be one of MasterCard, an issuing bank, another financial institution, and the like. The process 1000 begins at step 1002 when the issuing entity 108 receives a transmission from the transaction card 100. The transmission from the transaction card 100 via the POS terminal 102 contains the cardholder's account number 114, the monetary value of the good or service, the current value of the pre-authorized balance field, the current value of the pre-authorized limit field, the requested pre-authorized amount, the country code from the issuing country field of the transaction card 100, and a country code indicating the country in which the POS terminal 102 is located. Also included in this transmission to the issuing entity 108 is an authorization response cryptogram. Once the issuing entity 108 receives this message from the transaction card 100, the process 1000 advances to step 900. At step 900, the issuing entity 108 determines whether it may authorize a pending purchase transaction. Once the issuing entity 108 makes that determination, the process 1000 advances to step 1004.

In an alternate embodiment, the application currency code of the transaction card 100 and the POS currency code may replace the issuing country field of the transaction code 100 and the country code indicating the country in which the POS terminal 102 is located, respectively, during the process 1000.

At step 1004, the issuing entity 108 analyzes the underlying account associated with the transaction card 100 to determine whether the issuing entity 108 can authorize the requested change to the pre-authorized amount if the card holder requested an alteration to the pre-authorized amount. The issuing entity 108 utilizes business rules in order to make this determination. If the card holder requested a change to the pre-authorized amount and the issuing entity 108 determines that alteration of the pre-authorized amount to be equal to the requested pre-authorized amount, as specified by the card holder, can be authorized, the process 1000 advances to step 1008. Otherwise the process 1000 advances to step 1006.

At step 1006, the issuing entity 108 sends a message to the transaction card 100 including the authorization indicator, the updated pre-authorized balance and the updated pre-authorized limit. Once the issuing entity 108 transmits the message, the process 1000 exits.

At step 1008, the issuing entity 108 alters the pre-authorized limit and the pre-authorized balance and sends a message to the transaction card 100. The issuing entity 108 sets the updated pre-authorized limit and the pre-authorized balance such that the difference between the pre-authorized limit and the pre-authorized balance is equal to the requested pre-authorized amount. The issuing entity also updates the underlying account to reflect the alteration to the pre-authorized amount. The issuing entity 108 sends a message to the transaction card 100 including the authorization indicator, the updated pre-authorized limit, and the updated pre-authorized balance and the process 1000 exits.

Figure 9:
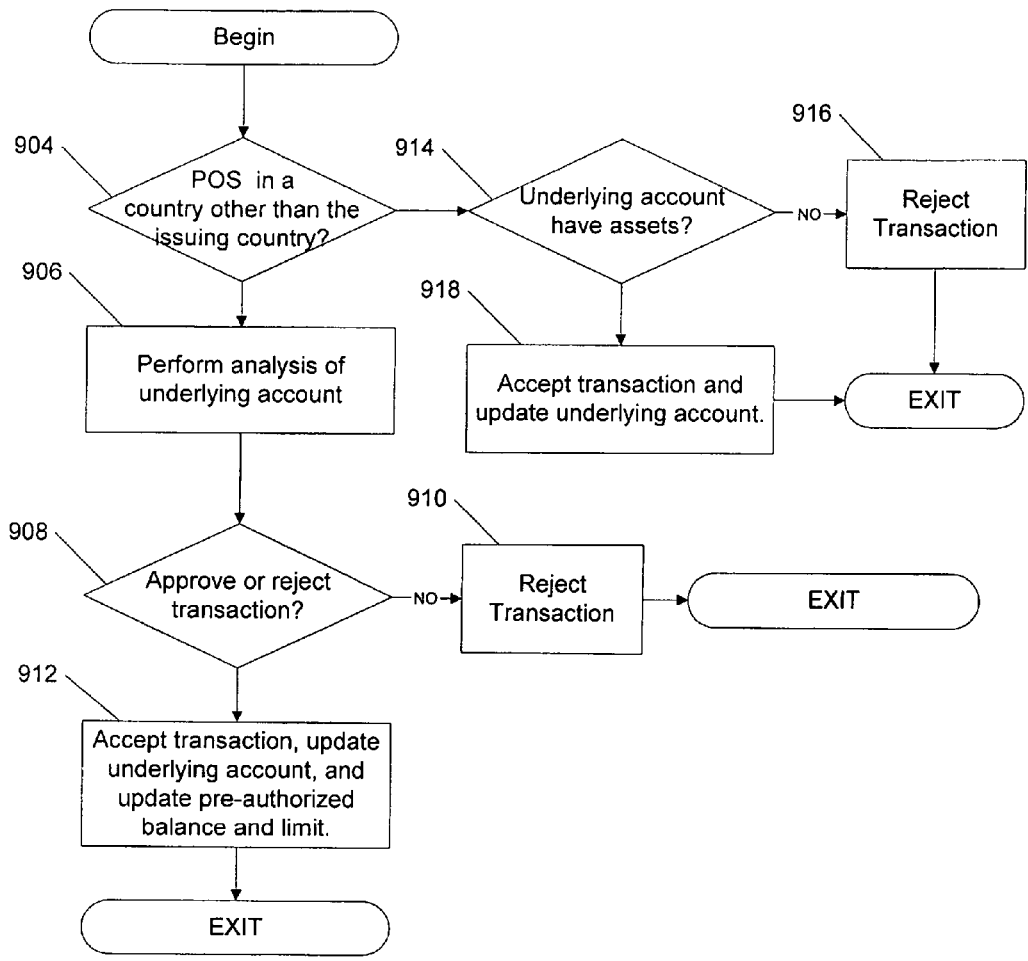
FIG. 9 illustrates a process whereby an issuing entity determines whether to authorize or deny a transaction and/or alters the pre-authorized amount according to an exemplary embodiment of the present invention.

FIG. 9 illustrates a process 900 whereby the issuing entity 108 determines whether it may authorize a pending purchase transaction. The process 900 begins at step 904 where the issuing entity 108 determines whether the location of the POS terminal 102 is within the same country as the country indicated by the issuing country field of the transaction card 100. If the country code from the POS terminal 102 is different than the country from the transaction card 100, the process 900 advances to step 916. Otherwise, the process 900 advances to step 906.

At step 906, the issuing entity 108 analyzes the underlying account associated with the pre-authorized amount of the transaction card 100 to determine whether an additional pre-authorized amount can be authorized. Increasing the pre-authorized amount may entail approving the transaction which requires more money than the currently authorized pre-authorized amount, and thereafter reducing the pre-authorized amount by adjusting the pre-authorized limit field and the pre-authorized balance field. The pre-authorized amount is determined by calculating the difference between the value stored in the pre-authorized limit field and the value stored in the pre-authorized balance field. The issuing entity 108 utilizes business rules in order to make this determination. An exemplary business rule is that the issuing entity 108 will only increase the effective pre-authorized amount of the transaction card 100 to equal the current monetary amount of the pre-authorized amount plus the negotiable assets currently deposited in the underlying account. Once the issuing entity 108 has performed this analysis on the underlying account, the process 900 advances to step 908.

At step 908, the issuing entity 108 makes the determination as to whether to authorize the request for additional funding of the pre-authorized amount. If the issuing entity 108 determines that the pre-authorized amount can be increased, the process 900 advances to step 912. Otherwise the process 900 advances to step 910.

At step 912, the issuing entity 108 updates an authorization indicator, an updated pre-authorized balance and an updated pre-authorized limit. The issuing entity 108 updates the authorization indicator to reflect the authorization of the pending purchase transaction and updates the underlying account to reflect the additional funding sent to the transaction card 100. The issuing entity 108 also sets the updated pre-authorized balance and the updated pre-authorized limit. The difference between the updated pre-authorized limit and the updated pre-authorized balance is the pre-authorized amount and may be equivalent to the amount of negotiable assets remaining as deposited in the underlying account minus the assets needed to honor the approved transaction, capped at an issuing entity 108 maximum. The underlying account is updated to reflect this pre-authorization and the process 900 exits.

At step 910, the issuing entity 108 updates the authorization indicator, the updated pre-authorized balance, and the updated pre-authorized limit. The issuing entity 108 updates the authorization indicator to reflect the denial of the pending purchase transaction, sets the pre-authorized balance and the pre-authorized limit accordingly and the process 900 exits.

At step 914, the issuing entity 108 analyzes the underlying account associated with the transaction card 100 to determine whether the issuing entity 108 can authorize the transaction. The issuing entity 108 utilizes business rules in order to make this determination. If the issuing entity 108 determines that the transaction can be authorized, the process 900 advances to step 918. Otherwise the process 900 advances to step 916.

At step 916, the issuing entity 108 updates the authorization indicator, the pre-authorized balance and the pre-authorized limit. The issuing entity 108 updates the authorization indicator to reflect the denial of the pending purchase transaction, sets the pre-authorized balance and the pre-authorized limit accordingly and the process 900 exits.

At step 918, the issuing entity 108 updates the authorization indicator, an updated pre-authorized balance and an updated pre-authorized limit. The issuing entity 108 updates the authorization indicator to reflect the authorization of the pending purchase transaction and updates the underlying account to reflect the additional funding sent to the transaction card 100. The issuing entity 108 also sets the updated pre-authorized balance and the updated pre-authorized limit. The difference between the updated pre-authorized limit and the updated pre-authorized balance is the pre-authorized amount and may be equivalent to the amount of negotiable assets remaining as deposited in the underlying account minus the assets needed to honor the approved transaction, capped at an issuing entity 108 maximum. The underlying account is updated to reflect this pre-authorization and the process 900 exits.

In another preferred embodiment, the issuing entity 108 receives a transmission from another terminal, such at an ATM, for an increase in the current monetary amount of the pre-authorized amount.

Although the present invention has been described with reference to certain preferred embodiments, various modifications, alterations, and substitutions will be known or obvious to those skilled in the art without departing from the spirit and scope of the invention, as defined by the appended claims.

The invention claimed is:

1. A method for conducting a financial transaction using an integrated circuit device compliant with at least one of the EMV '96 integrated circuit card and the EMV 2000 integrated circuit card specifications, said device issued by a device issuer, associated with a funding account having an account identifier, and capable of conducting off-line and on-line transactions with a payment card network, comprising:

(a) storing a pre-authorized balance on said integrated circuit device, said integrated circuit device configured with an upper cumulative offline transaction amount data element, of the MasterCard Chip card specification said upper cumulative offline transaction amount is used to store said pre-authorized balance, and said balance representing the value of transactions conducted with said device without on-line communication with said payment network for authorization of said transaction;
(b) providing said integrated circuit device with a pre-authorized limit;
(c) distributing said device to at least one person associated with said account for conducting said transaction;
(d) determining by said integrated circuit device to permit said financial transaction without first requesting on-line communication with said payment network for authorization of said transaction, when the transaction amount of said transaction is less than said pre-authorized limit less said pre-authorized balance, and adding said transaction amount of said transaction to said pre-authorized balance; and
(e) configuring said integrated circuit device to perform said transaction in an existing point of sale integrated circuit card reader compliant with at least one of the EMV '96 integrated circuit card and the EMV 2000 integrated circuit card specifications.

2. A method for conducting a financial transaction using an integrated circuit device compliant with at least one of the EMV '96 integrated circuit card and the EMV 2000 integrated circuit card specifications, said device issued by a device issuer, associated with a funding account having an account identifier, and capable of conducting off-line and on-line transactions with a payment card network, comprising:
(a) storing a pre-authorized balance on said integrated circuit device, said integrated circuit device configured with an upper cumulative offline transaction amount data element, of the MasterCard Chip card specification said upper cumulative offline transaction amount is used to store said pre-authorized balance, and said balance representing the cumulative value of transactions conducted with said device without on-line communication with said payment network for authorization of said transaction;
(b) providing said integrated circuit device with a pre-authorized limit;
(c) distributing said device to at least one person associated with said account for conducting said transaction;
(d) determining by said integrated circuit device to request on-line communication with said payment network before permitting said financial transaction when the transaction amount of said transaction is greater than said pre-authorized limit less pre-authorized balance;
(e) transferring a first amount from said funding account to said integrated circuit device prior to permitting said transaction to be performed and altering at least one of said pre-authorized balance and pre-authorized limit stored on said integrated circuit device such that the difference between said pre-authorized balance and said pre-authorized limit stored on said integrated circuit device increases by a second amount, said second amount based on said first amount, in response to authorization of an additional amount by said device issuer; and
(f) configuring said integrated circuit device to perform said transaction in an existing point of sale integrated circuit card reader compliant with at least one of the EMV '96 integrated circuit card and the EMV 2000 integrated circuit card specifications.

3. The method of claim 2 wherein said transferring said first amount from said account occurs before said altering at least one of said pre-authorized balance and said pre-authorized limit stored on said integrated circuit device.

4. The method of claim 2 wherein said transferring said first amount from said account occurs after said altering at least one of said pre-authorized balance and said pre-authorized limit stored on said integrated circuit device.

5. The method of claim 2 wherein said transferring said first amount from said account occurs at substantially the same time as said altering at least one of said pre-authorized balance and said pre-authorized limit stored on said integrated circuit device.

6. The method of claim 2, wherein said additional amount is authorized in response to receiving a request from a cardholder associated with said account.

7. The method of claim 6, wherein said additional amount is authorized only if said account has a balance greater than or equal to said additional amount.

8. The method of claim 2, wherein said additional amount is authorized in response to receiving an on-line communication over said payment network for authorization of said transaction when said transaction amount of said transaction is greater than said pre-authorized limit less said pre-authorized balance.

9. The method of claim 2, wherein said second amount is equal to said pre-authorized balance.

10. The method of claim 2, wherein said first amount is equal to said second amount.

11. The method of claim 2, wherein said altering at least one of said pre-authorized balance and said pre-authorized limit comprises transmitting a script message to update at least said upper cumulative offline transaction amount data element.

12. An integrated circuit payment device associated with a funding account for conducting a financial transaction, comprising:
(a) an interface configured to permit electrical communication with an existing point of sale integrated circuit card reader compliant with at least one of the EMV '96 integrated circuit card and the EMV 2000 integrated circuit card specifications, said reader further coupled to a payment network;
(b) a memory, having at least one pre-authorized limit and at least one pre-authorized balance stored therein, said pre-authorized balance representing the value of transactions conducted with said device without on-line communication with said payment network for authorization of said transaction, and at least a portion of said memory comprising an upper cumulative offline transaction amount data storage area of the MasterCard Chip card specification that stores the pre-authorized balance;
(c) one or more processors, coupled to said interface and said memory area, programmed to permit said financial transaction without requesting on-line communication via said interface with said payment network, when the transaction amount of said transaction is less than said pre-authorized limit less said pre-authorized balance, and further programmed to add said transaction amount of said transaction to said pre-authorized balance when said financial transaction is permitted;
(d) said processors further programmed to request on-line communication with said payment network via said interface before permitting said financial transaction when said transaction amount of said transaction is greater than said pre-authorized limit less said pre-authorized balance;
(e) said interface further configured to receive at least one script command via said interface, said script command corresponding to satisfaction of at least one prepayment criteria, said script command associated with a first prepayment amount previously debited from said funding account; and (f) said processors further programmed to alter at least one of said pre-authorized balance and said pre-authorized limit stored in said memory, in response to at least one script command, such that the difference between said pre-authorized balance and said pre-authorized limit increases by a second amount, said second amount based on said first amount.

13. The device of claim 12, wherein said second amount is equal to said pre-authorized balance.

14. The device of claim 12, wherein said first amount is equal to said second amount.

15. The device of claim 12, wherein said processors are programmed to transmit a script message to update at least said upper cumulative offline transaction amount data element.

* * * * *